Dec. 1, 1964   M. MILES   3,159,135
AUTOMOBILE SAFETY INSTRUMENT
Filed Dec. 14, 1962

INVENTOR
Marshall Miles

By William J. Newman
Attorney

United States Patent Office 3,159,135
Patented Dec. 1, 1964

3,159,135
AUTOMOBILE SAFETY INSTRUMENT
Marshall Miles, Wilmette, Ill., assignor to Stewart-Warner Corporation, Chicago, Ill., a corporation of Virginia
Filed Dec. 14, 1962, Ser. No. 244,779
2 Claims. (Cl. 116—57)

This invention relates to safety meters for vehicles such as automobiles, trucks and other road traversing means. More particularly, it relates to combined speed and safe stopping distance indicators.

U.S. Patent No. 2,845,721, issued to Charles Adler, Jr., discloses a spaceometer for indicating vehicle lengths required for stopping at any given speed. Mr. Adler's device is a separate unit designed to operate from the speedometer drive means. It has a linear dial calibrated in terms of vehicle lengths with the distance between markings representative of a car length. There is a fixed portrayal of a vehicle at one end of the dial and a moving portrayal covering a vehicle carried by a pointer actuated by a meter movement so that the distance between the fixed and moving vehicle portrayals is a scale representation of the safe stopping distance. An indication is provided which may be interpreted with a minimum amount of mental effort. Mr. Adler's spaceometer, however, requires that a separate instrument be provided apart from the regular speedometer which must necessarily be rather large if it is to be effective. Space must be provided on the already cluttered vehicle instrument panel preferably close to the speedometer which, of course, leads to substantial increased costs to the vehicle manufacturer.

Since the spacemeter is separate from the speedometer visual coordination between the two meters is difficult. The driver is required to view two separate meters, therefore lengthening the time during which his eyes are off the road.

In addition the patented spaceometer must utilize a special meter mechanism having a non-linear scale movement which is not disclosed. The safe stopping distance varies exponentially with the vehicle speed. Mr. Adler suggests that the meter be driven from the speedometer cable so that a non-linear movement is required to maintain the use of the desired linear scale dial face. This also leads to substantial increase in the manufacturer's costs.

It is an object of this invention to provide a safe stopping distance indicator which requires no separate instrument in the vehicle.

A further object of this invention is to provide a safe stopping distance indicator in conjunction with an ordinary drum-type speedometer in which both vehicle speed and safe stopping distance may be determined at a single glance.

It is also an object of this invention to provide a safe stopping distance indicator which does not require a meter having a non-linear movement.

It is a further object of this invention to provide a meter in which the added costs for the provision of combined speed and safe stopping distance indicating means are minimal.

Another object of this invention is to provide indicia means for use with a combined speed and safe stopping distance indicator.

Other objects and advantages of this invention will become apparent upon a further reading of the specification especially when taken in view of the accompanying drawings, in which.

Figure 3:
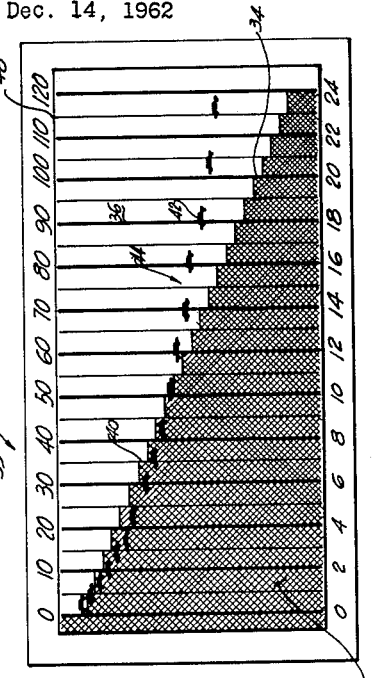
FIG. 3 is a flat projection on a reduced scale of the pattern to be applied to the cylindrical drum of the meters of FIGS. 1 and 2.

Briefly, the invention comprises an indicator drum mounted for rotation about its axis with means mounting said drum for rotation from an at rest position and means for angularly displacing the drum from its at rest position as a function of vehicle speed. A first linear scale is disposed lengthwise adjacent the periphery of the drum calibrated in terms of vehicle speed with a second linear scale disposed lengthwise adjacent the periphery of the drum calibrated in terms of safe stopping distance. A first graphic-type pattern is provided on the periphery of the drum and linearly spiraled thereabout for visual cooperation with the first linear scale to indicate the vehicle speed. A second graphic-type pattern is provided on the periphery of the drum and non-linearly spiraled thereabout for visual cooperation with the second linear scale to indicate the safe stopping distance for the indicated vehicle speed.

More specifically a meter embodying the teachings of this invention comprises a housing 12 with a drum 14 mounted for rotation about its axis therewithin. The housing has an elongated aperture 16 with a facia backing plate 18 between the aperture 16 and the drum 14. There is an elongated slit 20 in the facia backing plate 18 extending lengthwise along and adjacent to the periphery of the drum 14 so that a portion of the drum is viewable thereto.

A transparent plate 21 of glass, plastic, or the like is provided in front of the facia backing plate 18 and carries the calibration scales for speed and safe stopping distance at 22 and 24, respectively. Provisions are also made on the backing plate 18 and the transparent plate 21 for an odometer 26, turn signal indicators 28 and bright headlight indicator 29 to provide a compact instrument panel.

Figure 2:
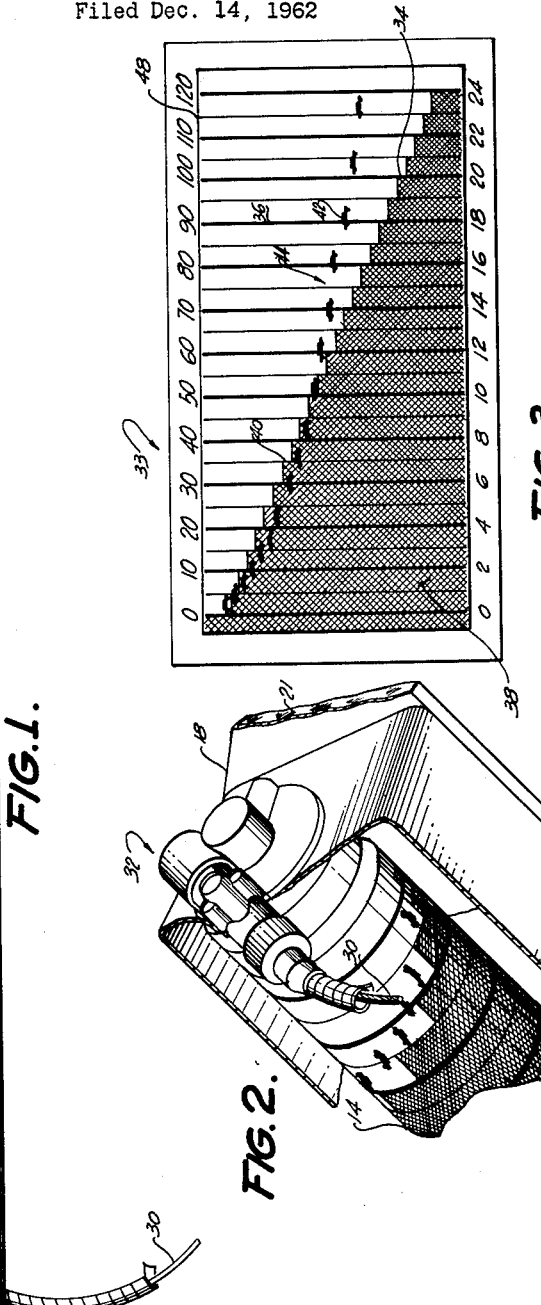
FIG. 2 is a partial view in perspective showing the drum and driving means therefor in a combined meter embodying the teachings of this invention.

As shown in FIG. 2 the drum 14 is driven by means of a speedometer cable 30 through gear and speed cup means 32 in a well known manner. The cable 30 is driven by a vehicle wheel or transmission (not shown) and the rate of rotation thereof is represented by a specified angular displacement of the drum 14 from an at rest position. It is to be understood that driving means other than the speedometer cable and speed cup 32 may be used, such as an electrical drive means in which electric current generated responsive to the vehicle speed is applied to the meter movement to rotate the drum 14.

The drum 14 carries a pattern 33 such as shown in FIG. 3 which is cooperative with the slit 20 in the backing plate 18 and the scale 22 and 24 on the transparent member 21 to give the desired indications. The pattern indicia representing vehicle speed comprises a substantially linear sloping line 34 formed by two contrasting colors 36 and 38 meeting in a diagonal across the length of the pattern. The line 34 has an essentially stepped configuration with the riser portion 40 being approximately equal in dimension with the width of slit 20. Thus when the pattern is wrapped around the drum 14 the line 34 appears as an essentially linear spiral thereabout. The speed scale 22 is so arranged with respect to the direction of rotation of the drum so that each half decade of vehicle speed is visualized through the slit 20 by a solid bar of color 38 extending from zero to the half decade speed with the contrasting color 36 extending from that point to the right-hand edge of the slit.

The indicia relating to the safe stopping distance is provided by the portrayals of vehicles 42 forming essentially a non-linear sloping line 44. There is a vehicle portrayal 42 level with each one of the riser portions 40 of the stepped speed characteristic 34 so that, for each half decade of speed represented through the slit 20, up to 80 m.p.h. on the illustrated embodiment there is a vehicle portrayal 42 which cooperates with the linear scale 18 to indicate safe stopping distance for the particular vehicle speed. Thus the line formed by the vehicle portrayals 42 forms a non-linear spiral when the pattern is wrapped about the drum 14.

A portrayal of a stationary vehicle 45 also appears on the plate 21 adjacent the left hand edge of slit 20. Thus, the physical distance between the stationary vehicle 45 and the vehicle 42 appearing on the drum through slit 20 is a representation in miniature of the actual safe stopping distance which is readily interpretable.

Figure 1:
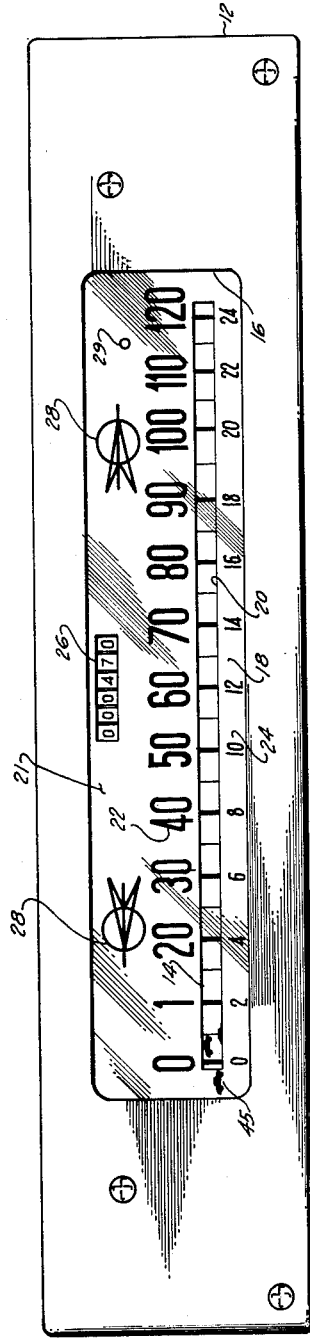
FIG. 1 is an elevation view of the front of a combined speed and safe stopping distance indicator showing the linear speed and safe stopping distance scales.

The pattern 33 may be in the form of a decalcomania 46 produced on a protective backing 48 and transferable onto the roller drum in the usual fashion. It will be noted that the decade and half decade calibration marks shown in the slit in FIG. 1 are actually on the pattern so that calibration problems are reduced to a minimum. It is to be understood that the pattern may be produced directly on the drum 14 or may be formed on other type sheets having adhesive backing so as to be attachable around the periphery of the drum.

While there has been shown one embodiment of the present invention, it is realized that many modifications and additions may be made thereto without departing from the scope of the invention. It is therefore intended to be limited only by the scope of the appended claims.

What is claimed is:

1. A combined vehicle speed and safe stopping distance indicator comprising opaque means defining a substantially horizontally disposed slit, an elongated drum rotatably mounted on a substantially horizontal axis adjacent to and substantially parallel with said slit, means defining a substantially linear spiral about the circumference of said drum, means defining an at rest position of said drum, means responsive to the speed of the vehicle for angularly displacing said drum to an angular position linearly related to said speed, at which position said spiral is visible through the slit at a distance from one end of said slit linearly related to said speed, a linear calibrated scale along said split cooperative with the visible portion of said spiral to indicate said vehicle speed, a plurality of bodies defining a non-linear spiral about the circumference of said drum, one of said bodies being visible through the slit in proximity to said one end when said drum is in its at rest position, each of the other of said bodies being visible through the slit at a distance from the one end of said slit linearly related to the safe stopping distance of said vehicle at a respective indicated vehicle speed, and a second linear scale calibrated in lengths of said bodies and cooperative with said bodies to indicate the safe stopping distance in terms of vehicle length.

2. A combined vehicle speed and safe stopping distance indicator comprising opaque means defining a substantially horizontally disposed slit, an elongated drum rotatably mounted on a substantially horizontal axis adjacent to and substantially parallel with said slit, two contrasting colors on said drum defining a substantially linear spiral about the circumference of said drum, means defining an at rest position of said drum, means responsive to the speed of the vehicle for angularly displacing the drum to an angular position linearly related to said speed, at which position said spiral is visible through the slit at a distance from one end of said slit linearly related to said speed, a linear calibrated scale along said slit cooperative with the visible portion of said spiral to indicate said vehicle speed, a fixed body at the one end of said slit, a plurality of bodies of a third contrasting color each of equal dimensions to said fixed body defining a non-linear spiral about the circumference of said drum, one of said bodies being visible through the slit in proximity to said one end when said drum is in its at rest position, each of the other of said bodies being visible through the slit at a distance from the one end of said slit linearly related to the safe stopping distance of said vehicle at a respective indicated vehicle speed, equally spaced markings along said slit, the distance between said markings being equal to the length of said bodies, said markings being cooperative with said bodies on said drum to indicate the safe stopping distance in terms of vehicle length.

References Cited in the file of this patent

UNITED STATES PATENTS

| | | |
|---|---|---|
| 1,893,090 | Kreidler | Jan. 3, 1933 |
| 2,175,129 | Rolfson | Oct. 3, 1939 |
| 2,305,789 | Kempf | Dec. 22, 1942 |
| 2,340,403 | Morby et al. | Feb. 1, 1944 |
| 2,679,229 | Roderman | May 25, 1954 |
| 2,702,518 | Swartzlander | Feb. 22, 1955 |
| 2,722,833 | Meshberg | Nov. 8, 1955 |
| 2,802,442 | Helgeby | Aug. 13, 1957 |
| 2,845,721 | Alder | Aug. 5, 1958 |